(12) United States Patent
Horng et al.

(10) Patent No.: US 6,407,525 B1
(45) Date of Patent: Jun. 18, 2002

(54) THERMAL CONTROL VARIABLE SPEED FAN MOTOR

(75) Inventors: Alex Horng; Nan Long Tsai, both of Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/783,563

(22) Filed: Feb. 15, 2001

(51) Int. Cl.⁷ .................................................. G05B 5/00
(52) U.S. Cl. ........................ 318/473; 318/471; 318/472; 388/934
(58) Field of Search ................................ 318/473, 472, 318/471; 388/934; 236/49.3

(56) References Cited

U.S. PATENT DOCUMENTS

| | | | |
|---|---|---|---|
| 4,722,669 A | * | 2/1988 | Kundert ...................... 318/473 |
| 5,197,858 A | | 3/1993 | Cheng |
| 5,251,814 A | * | 10/1993 | Warashina et al. ......... 236/49.3 |
| 5,942,866 A | | 8/1999 | Hsieh |

* cited by examiner

Primary Examiner—Karen Masih
(74) Attorney, Agent, or Firm—Bacon & Thomas, PLLC

(57) ABSTRACT

A thermal control variable speed fan motor comprises a rectifying circuit, a differential amplifier, and a temperature-sensing circuit. The rectifying circuit converts a speed signal detected from the fan into a voltage that is outputted to a negative terminal of the differential amplifier. A positive terminal of the differential amplifier is connected to the temperature-sensing circuit that is connected in series with a power source. The temperature-sensing circuit includes a temperature sensor having a resistance that varies in response to a change in ambient temperature. When ambient temperature rises, the drive voltage outputted by the differential amplifier increases and the fan speed increases. When ambient temperature reduces, the drive voltage decreases and the fan speed decreases, thereby changing the fan speed linearly by thermal control.

3 Claims, 4 Drawing Sheets

THERMAL CONTROL VARIABLE SPEED FAN MOTOR

BACKGROUND OF THE INVENTION

1. Field of the Invention

The present invention relates to a thermal control variable speed fan motor, and more particularly to a fan motor in which a detected speed signal is converted into a voltage by an rectifying circuit, the voltage is compared by a differential amplifier to output a drive voltage for driving the fan. The drive voltage has smooth waveforms to linearly change the speed of the fan by thermal control.

2. Description of the Related Art

A conventional fan motor is shown in FIG. 1 and FIG. 2 (including FIGS. 2A–2C) of the drawings that correspond to FIG. 2 and FIG. 5 (including FIGS. 5A–5C) of U.S. Pat. No. 5,197,858 to Cheng issued on Mar. 30, 1993. FIG. 1 is a circuit diagram of a controller for the fan. FIG. 2 illustrates the output waveforms for the drive IC of the circuit. As illustrated in FIG. 1, when the power is on, via an inverse voltage protection diode D1, impellers start to rotate by mutual induction between winding coils and magnet. At this time, a Hall element IC1 senses the variation of magnetic field between winding and magnet to cause the DC brushless motor to commute as follows: A predetermined current and DC level are supplied by resistors R3, R2. Positive (V+) and negative (V−) voltages are both output from the Hall element IC1 to a driving integrated circuit IC2. The two voltage waveforms can be shaped by means of the driving integrated circuit IC2 by comparing them with an internal voltage to obtain the waveform shown in FIG. 2A. This waveform controls semiconductor switches A1 and A2 to obtain the waveform shown as FIGS. 2B and 2C. Motor windings L1, L2, L3, and L4 are controlled by the wave output from the semiconductor switches A1, A2 to commutate in accordance with the magnetic couple with magnet. The capacitor C1 provides voltage to the driving integrated circuit IC2 for re-starting of the motor from a completely motionless state of the fan. As a result, a driving system composed of IC1 and IC2 can drive the fan and output a cycle-timing pulse signal. IC3 comprises three internal operational amplifiers IC31, IC32, IC33. Operational amplifiers IC31, with resistors R4, R5, R6, R7, R8, R9, R10 and a thermal sensor Rth in combination, forms a control circuit for the slope of the curve of the speed versus the temperature of the thermal control variable speed fan. Because the resistance value of the thermal sensor Rth changes with temperature, the voltage Vth which is dependent upon the resistance of sensor Rth and resistor R4 will also be changed as the temperature changes. Voltage Vth and the reference voltage Vref, which is controlled by the voltage divider formed by resistors R9 and R10 are input into operational amplifier IC31, to obtain a variable voltage Vo, which causes the collector current of transistor TR1 to change accordingly, changing the speed of the fan. Therefore, the object of the variable speed by thermal control is achieved.

Nevertheless, the waveforms output from the drive integrated circuit IC2 to the windings L1, L2, L3, and L4 are rectangular waveforms, as shown in FIGS. 2B and 2C. In addition, although the change in the output voltage Vb by the operational amplifier IC31 in response to change in the environmental temperature make a change in the conductive current in the transistor TR2, output waveforms of the transistor TR2 are still rectangular waveforms. Thus, rotating speed of the fan is increased or reduced suddenly due to rectangular waveforms inputted to the windings L1, L2, L3, and L4. As a result, the fan wobbles and thus has a shortened longevity.

Another conventional fan motor is shown in FIGS. 3 and 4 of the drawings that correspond to FIGS. 2 and 3 of U.S. Pat. No. 5,942,866 to Hsieh issued on Aug. 24, 1999. FIG. 3 is a schematic block diagram of a control circuit. FIG. 4 shows the voltage signal outputted from a switching device of the control circuit. As illustrated in FIG. 3, a control circuit 10 for a DC brushless fan comprises a rectifying circuit 20, a comparator 21, and a switching device 22. The rectifying circuit 20 receives a continuous, rectangular wave signal from the fan 23, which is indicative of the rotating speed of the fan 23, and then sends a rectified and filtered DC voltage signal V1 to inverted input terminal of the comparator 20. The non-inverted input terminal of the comparator 21 is connected to a reference voltage signal Vref, which is used for setting the rotating speed of the fan 23, and the output terminal of the comparator 21 is connected to the switching device 22. The switching device 22 may be a transistor or an equivalent electronic switch that is serially connected between a source voltage Vcc and the source terminal of the fan 23. The operation of the switching device 22 depends on the compared result of the rectified DC voltage signal V1 outputted from the rectifying circuit 21 and the reference voltage signal Vref.

When the DC voltage signal V1 outputted from the rectifying circuit 21 is lower than the reference voltage signal Vref, i.e., the rotating speed of the fan 23 is. lower than its setting value, the comparator 21 outputs a Logic high value to the switching device 22. Then, the switching device 22 is closed, and the fan 23 is powered on. Thus, rotating speed of the fan 23 will be increased.

In contrast, when the DC voltage signal outputted from the rectifying circuit 20 is higher than the reference voltage signal Vref, i.e., the rotating speed of the fan 23 is higher than its setting value, the comparator 21 outputs a Logic low value to the switching device 22. Then, the switching device 22 is opened, and the fan 23 is powered off. Thus, rotating speed of the fan 23 will be decreased.

In operation, the switching device 22 is repeatedly closed and opened as the rotating speed of the fan varies, thus the fan is intermittently powered on, whereby the rotating speed of the fan 23 can be controlled and kept at a constant value. As illustrated in FIG. 4, the output signal of the switching device 22 is an intermittently opened and closed rectangular wave, where the period (TIME ON) during which the switching device 22 is closed and the period (TIME OFF) during which the switching device 22 is opened are modulated so as to control the rotating speed of the fan 23.

Nevertheless, the output waveform is an intermittently opened and closed rectangular waveform, and the rotating speed of the fan 23 is increased or decreased suddenly in response to opening or closing of the rectangular waveform or the switching device 22. As a result, the fan wobbles and thus has a shortened longevity.

SUMMARY OF THE INVENTION

In view of the above drawbacks, the present invention provides a thermal control variable speed fan motor in which a detected speed signal is converted into a voltage by an rectifying circuit, the voltage is compared by a differential amplifier with a voltage generated as a result of a temperature change detected by a temperature sensor. The differential amplifier outputs a drive voltage with smooth waveforms for driving the fan. The speed of the fan increases or decreases linearly to avoid sudden increase or decrease in the speed, thereby lengthening longevity of the fan.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

A preferred embodiment in accordance with the present invention will now be described with reference to the accompanying drawings.

Figure 1:
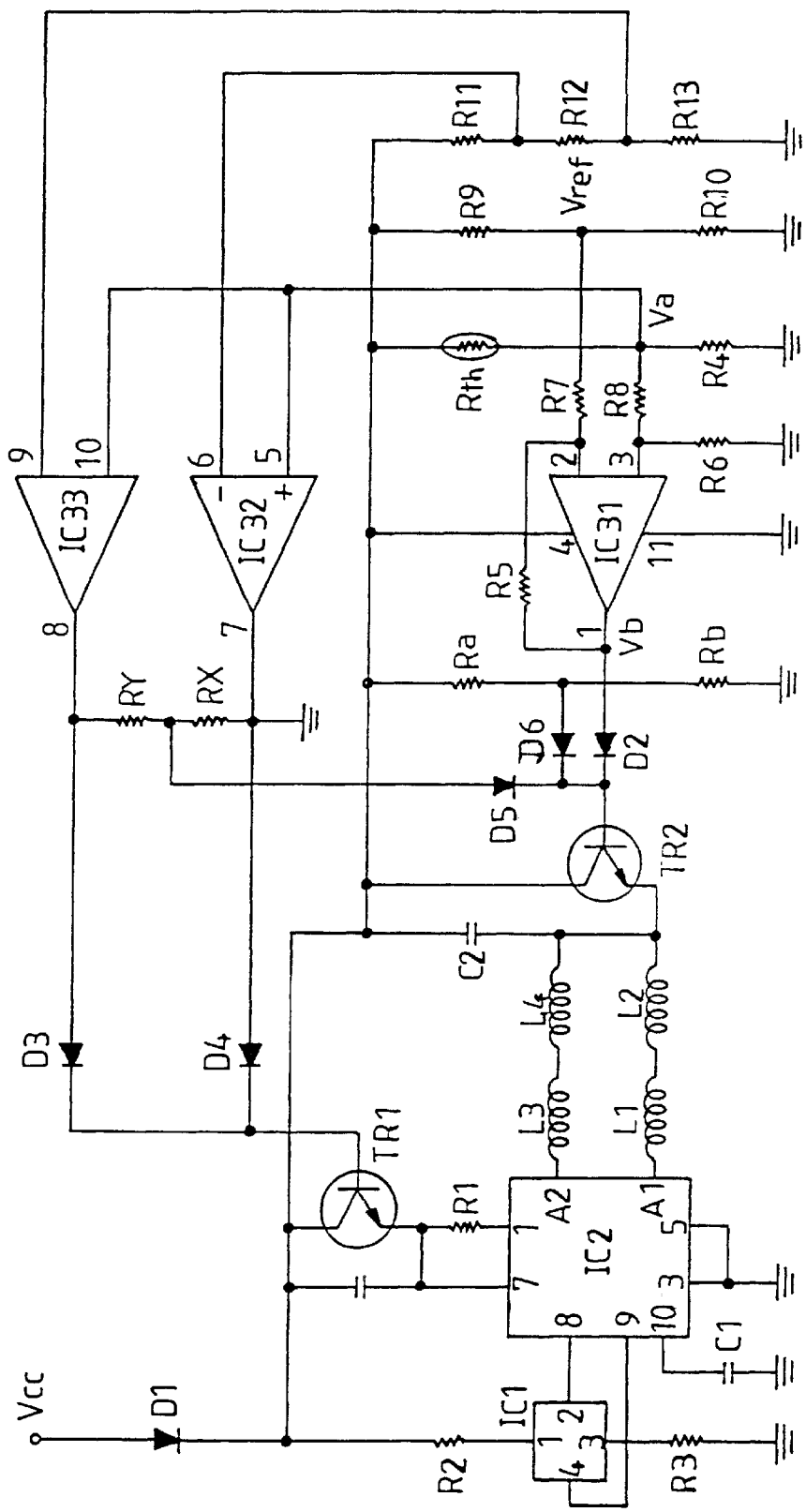
FIG. 1 is a circuit diagram of a conventional controller for the fan.
Figure 2:
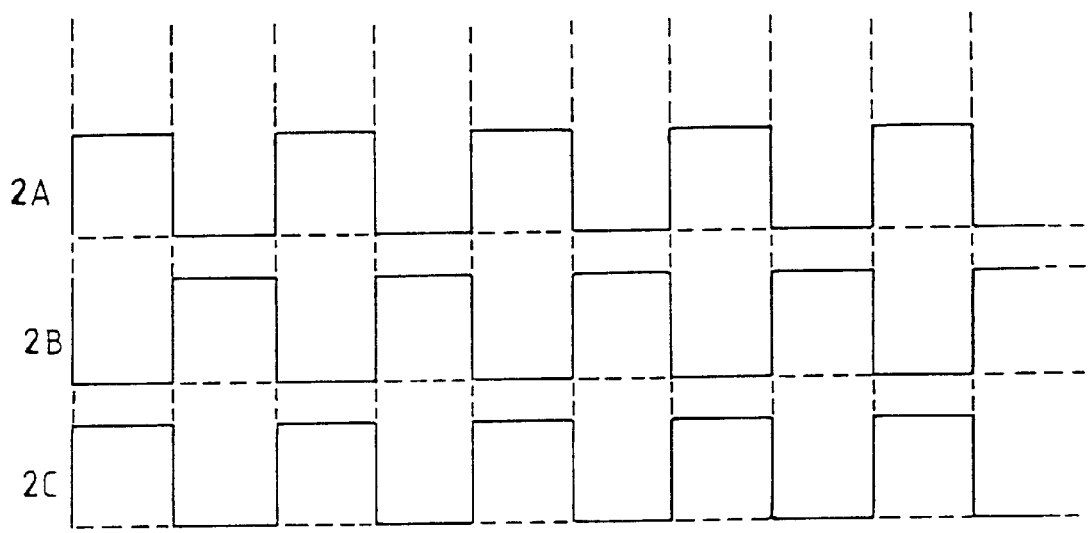
FIG. 2 is a diagram illustrating the output waveforms for the drive IC of the circuit in FIG. 1.
Figure 3:
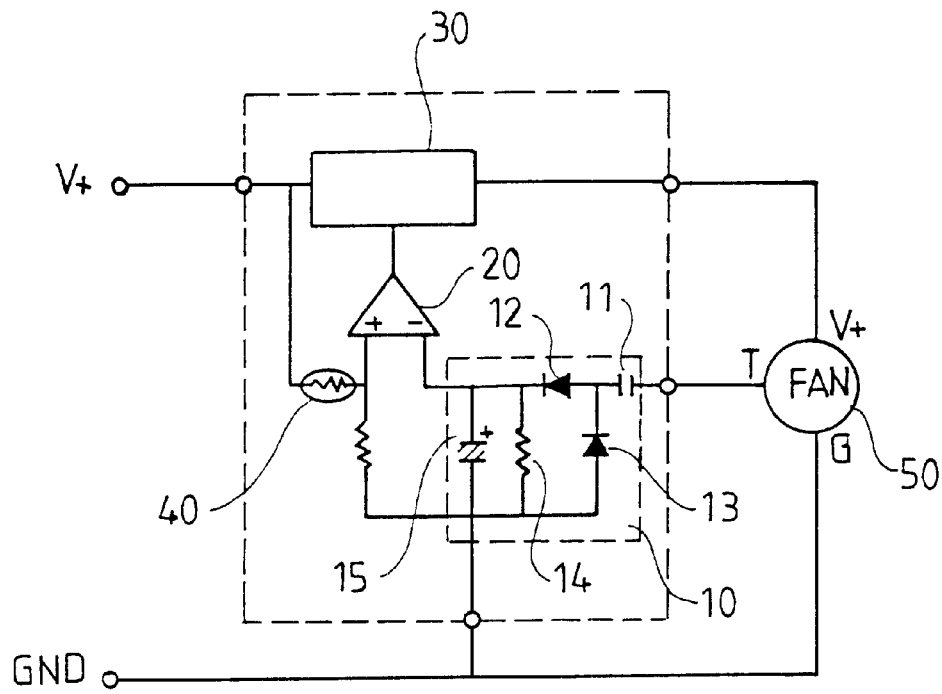
FIG. 3 is a schematic block diagram of another conventional control circuit.
Figure 4:
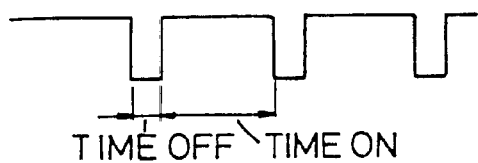
FIG. 4 shows the voltage signal outputted from a switching device of the control circuit in FIG. 3.
Figure 5:
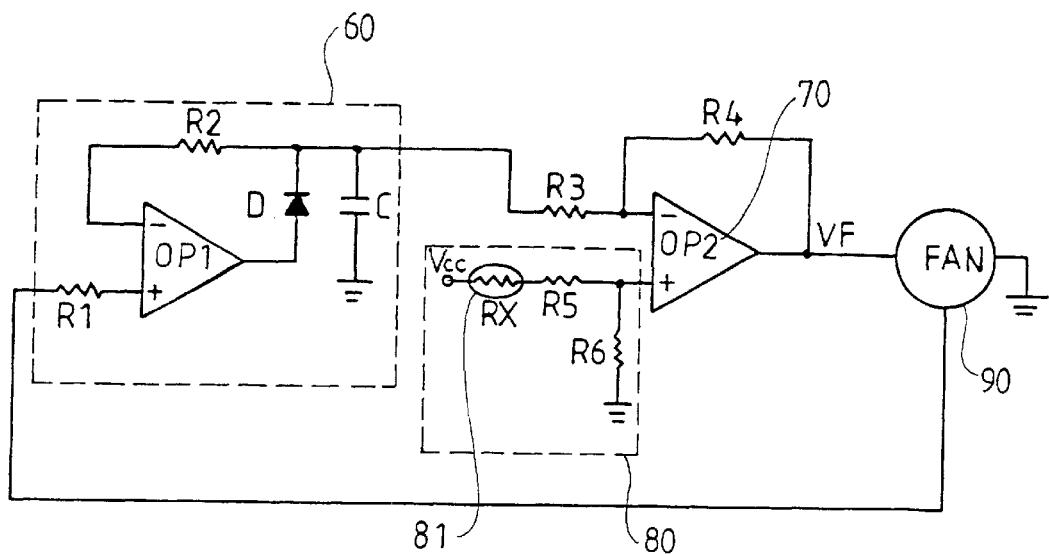
FIG. 5 is a diagram of a circuit for a fan motor in accordance with the present invention.

Referring to FIG. 5, a thermal control variable speed fan motor in accordance with the present invention generally includes a rectifying circuit 60, a differential amplifier 70, and a temperature-sensing circuit 80. The rectifying circuit 60 is mounted between a negative terminal of the differential amplifier 70 and a speed detected end of a fan 90. The rectifying circuit 60 includes an operational amplifier OP1, two resistors R1 and R2, a diode D1, and a filter capacitor C. The rectifying circuit 60 converts a speed signal detected from the fan 90 into a voltage after rectification and filtration. The voltage is inputted into the negative terminal of the differential amplifier 70 after passing through a resistor R3. A positive terminal of the differential amplifier 70 (OP2) is connected in series with the temperature-sensing circuit 80.

The temperature-sensing circuit 80 includes a temperature sensor 81 and two resistors R5 and R6. The temperature sensor 81 is preferably a thermistor Rx. A power source Vcc is electrically connected to the temperature sensor 81 and then connected in series with the resistor R5 and connected in parallel with the resistor R6 before connected to the positive terminal of the differential amplifier 70. After comparing the voltage at the positive terminal with the voltage at the negative terminal, the differential amplifier 70 outputs a drive voltage Vf that is connected to the fan 90 for driving the fan 90.

When ambient temperature rises, the resistance of the temperature sensor 81 decreases. At this time, the voltage at the positive terminal of the differential amplifier 70 increases gradually and the voltage (of the detected speed signal) at the negative terminal of the differential amplifier 70 decreases. Thus, the drive voltage Vf outputted to the fan 90 increases gradually to thereby increase the speed of the fan 90 gradually.

When ambient temperature reduces, the resistance of the temperature sensor 81 increases. At this time, the voltage at the positive terminal of the differential amplifier 70 decreases gradually and the voltage (of the detected speed signal) at the negative terminal of the differential amplifier 70 increases. Thus, the drive voltage Vf outputted to the fan 90 decreases gradually to thereby decrease the speed of the fan 90 gradually.

Figure 6:
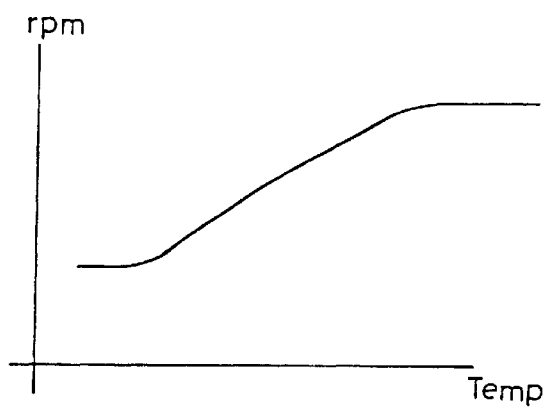
FIG. 6 is a schematic diagram of speed of the fan versus temperature.

Referring to FIG. 6, a change in the drive voltage Vf outputted to the fan 90 in response to a temperature change detected by the temperature sensor 81 changes the speed of the fan 90. As a result, the speed of the fan 90 is in proportion to the ambient temperature and the outputted drive voltage Vf. The curvatures of the ambient temperature and the fan speed are smooth and linear. Thus, the speed of the fan 90 increases or decreases gradually to avoid sudden change in the fan speed. Longevity of the fan 90 is thus lengthened.

The drive voltage for the fans disclosed in U.S. Pat. No. 5,197,858 and 5,942,866 generates rectangular waveforms such that the speed of the fan increases or decreases suddenly. The fan wobbles due to the sudden speed change and the longevity of the fan is shortened. Yet, in the fan in accordance with the present invention, the speed increases or decreases gradually. This is because the power source Vcc, after passing through the temperature-sensing circuit 80 and the differential amplifier 70, outputs a drive voltage Vf that is linear and changes smoothly. Speed of the fan changes smoothly without wobbling.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A thermal control variable speed fan motor comprising:
a fan, the fan outputting a speed signal that is converted into a voltage;
a temperature-sensing circuit connected in series with a power source and including a temperature sensor, the temperature sensor having a resistance that varies in response to a change in ambient temperature; and
a differential amplifier connected between the fan and the temperature-sensing circuit, the differential amplifier including a positive terminal to which the voltage source is inputted and a negative terminal to which the voltage converted from the speed signal is inputted, the differential amplifier comparing a voltage outputted by the voltage source to the positive terminal and the voltage converted from the speed signal and outputted to the negative terminal and then outputting a drive voltage for driving the fan;
wherein a voltage value of the power source varies in response to a temperature change detected by the temperature-sensing circuit, thereby changing the voltage outputted to the positive terminal of the differential amplifier;
wherein when ambient temperature rises, the resistance of the temperature sensor decreases, the voltage at the positive terminal of the differential amplifier increases gradually and the voltage at the negative terminal of the differential amplifier decreases, the drive voltage outputted to the fan increases gradually to thereby increase the speed of the fan gradually; and
wherein when ambient temperature reduces, the resistance of the temperature sensor increases, the voltage at the positive terminal of the differential amplifier decreases gradually and the voltage at the negative terminal of the differential amplifier increases, the drive voltage outputted to the fan decreases gradually to thereby decrease the speed of the fan gradually, and the drive voltage outputted by the differential amplifier has smooth linear waveforms.

2. The thermal control variable speed fan motor as claimed in claim 1, further comprising a rectifying circuit mounted between the negative terminal of the differential amplifier and the fan-speed detected end, the rectifying circuit comprising an operational amplifier, a capacitor, two resistors, and a diode, the rectifying circuit converting the signal from a fan-speed detected end into the voltage that is outputted to the negative terminal of the differential amplifier.

3. The thermal control variable speed fan motor as claimed in claim 1, wherein the temperature-sensing circuit includes a temperature sensor and two resistors, the temperature sensor includes a resistance that varies in response to a change in ambient temperature.

* * * * *